(12) United States Patent
Li et al.

(10) Patent No.: US 11,960,142 B2
(45) Date of Patent: Apr. 16, 2024

(54) PRISM MODULE OF CAMERA LENS

(71) Applicant: AAC Optics Solutions Pte. Ltd., Singapore (SG)

(72) Inventors: Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 870 days.

(21) Appl. No.: 16/997,913

(22) Filed: Aug. 19, 2020

(65) Prior Publication Data

US 2020/0379213 A1 Dec. 3, 2020

Related U.S. Application Data

(63) Continuation of application No. PCT/CN2020/093454, filed on May 29, 2020.

(30) Foreign Application Priority Data

Jun. 1, 2019 (WO) ................. PCT/CN2019/089715
Jun. 4, 2019 (CN) .......................... 201910479411.6

(51) Int. Cl.
*G02B 7/18* (2021.01)

(52) U.S. Cl.
CPC .................................. *G02B 7/1805* (2013.01)

(58) Field of Classification Search
None
See application file for complete search history.

(56) References Cited

U.S. PATENT DOCUMENTS

| 5,737,346 A * | 4/1998 | Stenstrom | G02B 7/00 |
| | | | 359/326 |
| 5,749,641 A * | 5/1998 | Brice | G02B 27/1046 |
| | | | 348/E9.027 |
| 2017/0294476 A1* | 10/2017 | Hu | G02B 7/1805 |
| 2018/0321504 A1* | 11/2018 | Hu | G02B 7/09 |
| 2019/0121103 A1* | 4/2019 | Bachar | G02B 7/005 |

* cited by examiner

*Primary Examiner* — Jennifer D. Carruth
(74) *Attorney, Agent, or Firm* — W&G Law Group

(57) ABSTRACT

A prism module of a camera lens includes a fixed holder, a rotary holder, a prism mounted on the rotary holder, a rotation driver assembly provided between the fixed holder and the rotary holder, and a circuit board. The rotary holder includes a base and a rotation driver bracket. The rotation driver assembly is made of memory alloys and deformed, under control of an electrical signal transmitted from the circuit board, to drive the base to rotate. The base and the rotation connecting bracket are directly connected to each other, simplifying the structure of the prism module and reducing the production cost of the prism module. The rotation driver assembly drives the rotary holder and the prism to rotate relative to the fixed holder, in such a manner that the prism can be driven by the rotation driver assembly to automatically correct its angle, thereby providing clearer imaging effect.

9 Claims, 9 Drawing Sheets

PRISM MODULE OF CAMERA LENS

TECHNICAL FIELD

The present invention relates to the technical field of optical imaging, in particular to a prism module of a camera lens applied in mobile electronic devices such as a cellphone.

BACKGROUND

With the development of the imaging technology and the emergence of the electronic products with imaging function, optical lenses are widely applied in various electronic products.

A prism module of a camera lens typically includes a fixed base, a rotary base, a prism mounted to the rotary base, a rotating connection assembly that rotationally connects the rotary base with the fixed base, and a rotation driver assembly for driving the rotary base to rotate relative to the fixed base. The rotating connection assembly is composed of a plurality of components including a holding frame, a spring frame, a partition plate, balls, and a magnet that are assembled and matched with each other. The prism module has a complex structure and involves many materials, its processing and assembling are complicate, and its production cost is high. Therefore, the prism module is not suitable for mass production.

In view of this, it is necessary to provide a prism module of a camera lens to solve the problem of complicated internal structure of the prism module.

SUMMARY

A prism module having a simple structure is provided to facilitate angle adjustment of a prism located in a camera lens.

An embodiment of the present invention provides a prism module of a camera lens. The prism module of the camera lens includes: a fixed holder; a rotary holder rotatably mounted on the fixed holder; a prism mounted to the rotary holder and rotatable with the rotary holder; a rotation driver assembly provided between the fixed holder and the rotary holder and configured to drive the rotary holder to rotate relative to the fixed holder; and a circuit board electrically connected to the rotation driver assembly. The rotary holder includes a base for receiving and locating the prism, and a rotation connecting bracket provided at a side of the base facing towards the fixed holder and configured to support a rotation of the base, and the rotation driver assembly is made of a memory alloy, in such a manner that the rotation driver assembly is deformed, under control of an electric signal transmitted from the circuit board, to drive the base to rotate.

As an improvement, the base includes a base plate that carries the prism, the base plate includes two first side edges spaced apart from each other and two second side edges that are spaced apart from and opposite to each other and are perpendicularly connected to the two first side edges, respectively. The rotation driver assembly includes a first memory alloy, a second memory alloy, a third memory alloy, and a fourth memory alloy. The first memory alloy and the second memory alloy are connected to the base plate and the fixed holder from the two second side edges, respectively, and the third memory alloy and the fourth memory alloy are connected to the base plate and the fixed holder from the two first side edges, respectively. The first memory alloy and the second memory alloy drive the base plate in such a manner that the prism is driven to rotate about a first rotation axis, and the third memory alloy and the fourth memory alloy drive the base plate in such a manner that the prism is driven to rotate about a second rotation axis. The first rotation axis perpendicularly intersects the second rotation axis.

As an improvement, the rotation connecting bracket includes a first elastic support arm, a second elastic support arm, a third elastic support arm and a fourth elastic support arm. Each of the first elastic support arm, the second elastic support arm, the third elastic support arm, and the fourth elastic support arm has one end fixed to the fixed holder, another end of the first elastic support arm and another end of the second elastic support arm faces towards the two second side edges of the base plate, respectively, in such a manner that the base plate is supported to drive the prism to rotate about the first rotation axis. Another end of the third elastic support arm and another end of the fourth elastic support arm face towards the two first side edges of the base plate, respectively, in such a manner that the base plate is supported to drive the prism to rotate about the second rotation axis.

As an improvement, the base further includes two side plates, the two side plates extend from the two second side edges of the base plate along a direction facing away from the fixed holder, respectively, and the base plate and the two side plates define a receiving groove in which the prism is mounted.

As an improvement, the fixed holder includes a horizontal support plate, a vertical support plate and a supporting boss. The vertical support plate extends from one end of the horizontal support plate while being bent, the vertical support plate and the horizontal support plate define a recess, the supporting boss is convexly arranged in the recess and has an inclined surface extending obliquely from the vertical support plate to the horizontal support plate, and the rotation connecting bracket abuts against the inclined surface.

As an improvement, the first memory alloy has two ends fixed to one side surface of the supporting boss and a middle portion hooked on one of the two side plates in such a manner that the first memory alloy is formed into a "V" shape; and the second memory alloy has two ends fixed on another side surface of the supporting boss and a middle portion of the second memory alloy hooked on the other one of the two side plates in such a manner that the second memory alloy is formed into a "V" shape.

As an improvement, the prism module of the camera lens further includes two first connecting terminals mounted to one side of the supporting boss and spaced apart from each other, and two second connecting terminals mounted to another side of the supporting boss and spaced apart from each other, and/or, a first hanging post provided on a side of each of the two side plates facing away from the receiving groove. The two ends of the first memory alloy are connected to the two first connecting terminals, respectively, and the two ends of the second memory alloy are connected to the two second connecting terminals, respectively. The middle portion of the first memory alloy is hooked on the first hanging post of one of the two side plates, and the middle portion of the second memory alloy is hooked on the first hanging post of the other one of the two side plates.

As an improvement, the third memory alloy has two ends fixed to a side surface of the horizontal support plate facing away from the recess, and a middle portion hooked on one of the first side edges of the base plate in such a manner that the third memory alloy is formed into a "V" shape; and the fourth memory alloy has two ends fixed ton a side surface of the vertical support plate facing away from the recess, and a middle portion hooked on the other one of the two first side edge of the base plate in such a manner that the fourth memory alloy is formed into a "V" shape.

As an improvement, the prism module of the camera lens further includes two third connecting terminals mounted to the side surface of the horizontal support plate facing away from the recess and spaced apart from each other, and the two fourth connecting terminals mounted to the side surface of the vertical support plate facing away from the recess and spaced apart from each other, and/or two second hanging posts convexly provided on a side of the base plate facing towards the recess and respectively close to the two first side edges. The two ends of the third memory alloy are connected to the two third connecting terminals, respectively, and the two ends of the fourth memory alloy are connected to the two fourth connecting terminals, respectively. The middle portion of the third memory alloy is hooked on one of the two second hanging posts, and the middle portion of the fourth memory alloy is hooked on the other one of the two second hanging posts.

As an improvement, a first avoiding groove for avoiding the third memory alloy is provided on a side surface of the horizontal support plate facing away from the supporting boss, and a second avoiding groove for avoiding the fourth memory alloy is provided on a side surface of the vertical support plate facing away from the supporting boss; and/or the prism module further includes an outer frame. The fixed holder, the rotary holder, the prism, the rotation driver assembly, the two first connecting terminals, the two second connecting terminals, the two third connecting terminals, and the two fourth connecting terminals are all received in the outer frame, the two first connecting terminals, the two second connecting terminals, the two third connecting terminals, and the two fourth connecting terminals are all electrically connected to the circuit board, the outer frame is provided with a first opening, through which light is to enter the prism, and a second opening, through which the light is exit the prism after being refracted, and the first opening and the second opening are provided on two adjacent side surfaces of the outer frame, respectively.

In the present invention, the base and the rotation connecting bracket are directly connected to each other to form the rotary holder, the rotary holder is rotatably connected to the fixed holder through the rotation connecting bracket arranged on the rotary holder, and no additional connecting members are provided between the rotary holder and the fixed holder, which can simplify the structure of the prism module of the camera lens, reduce the number of components of the prism module, reduce the assembly process steps, and reduce the manufacturing cost of the rotary holder, enabling mass production. In specific applications, the rotary holder and the prism are driven to rotate relative to the fixed holder, in such a manner that the prism can be driven by the rotation driver assembly to automatically correct its angle, thereby providing clearer imaging effect.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

Figure 1:
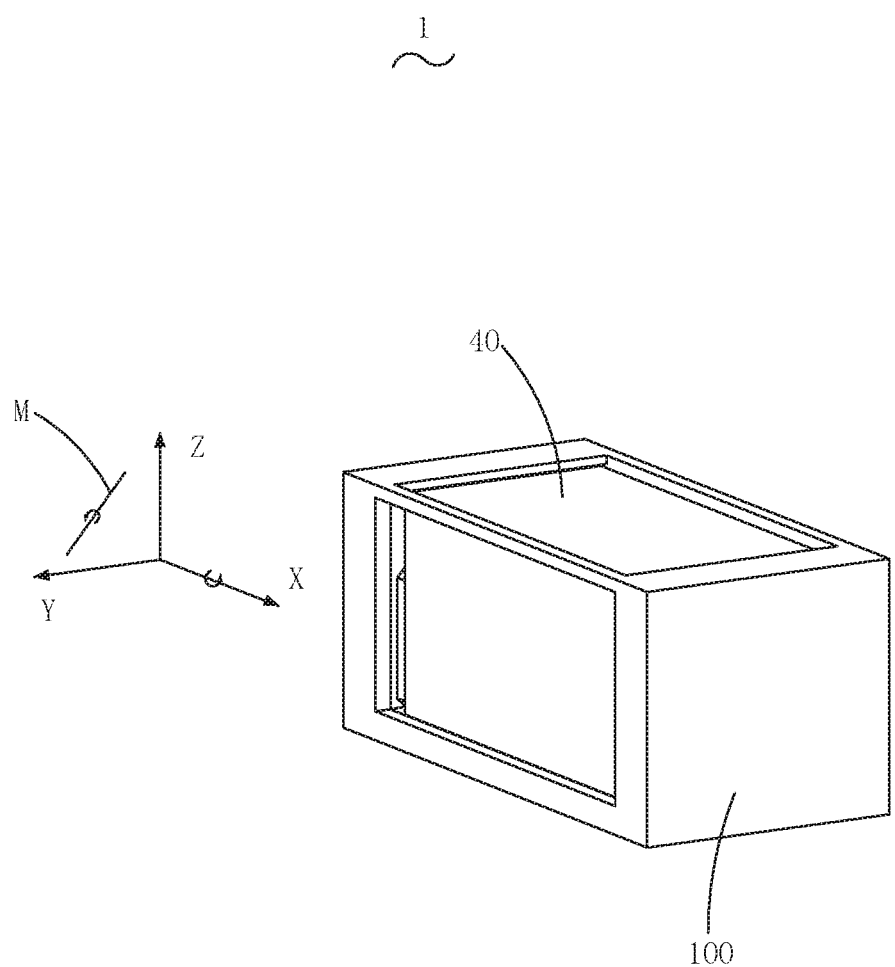
FIG. 1 is a three-dimensional diagram of a prism module of a camera lens.
Figure 2:
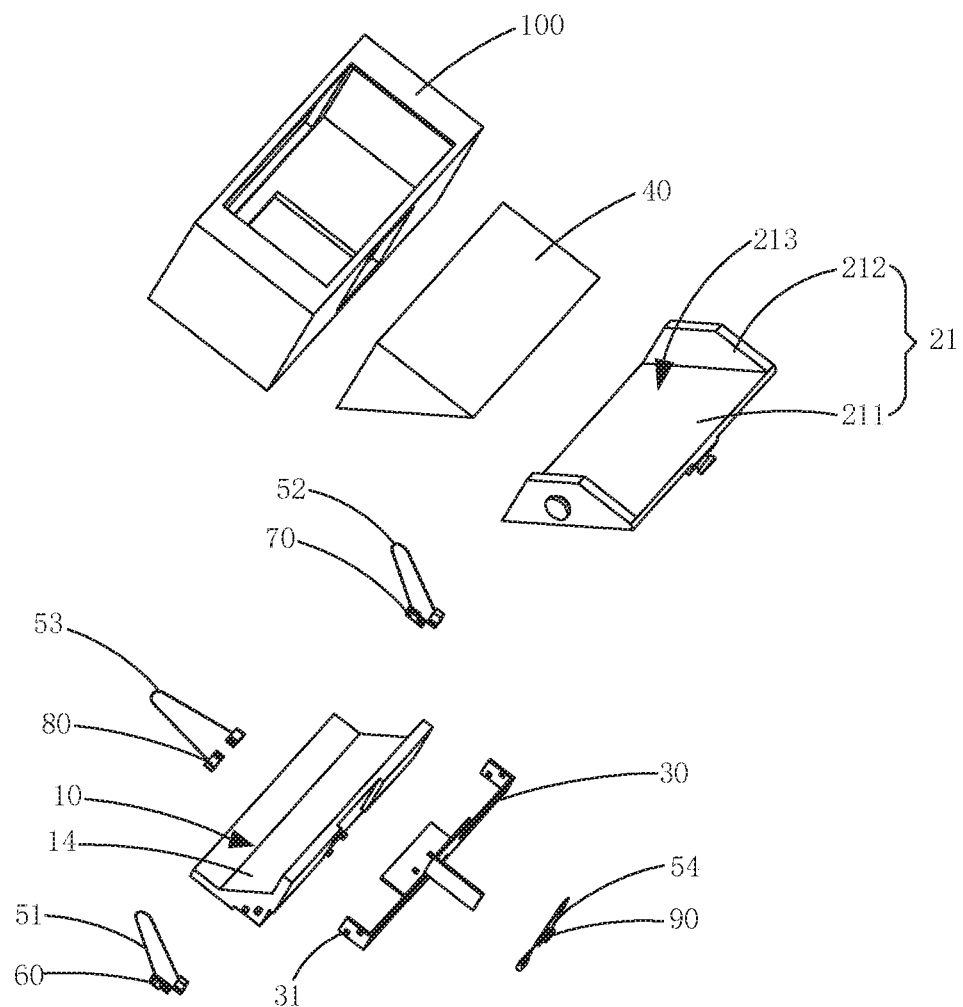
FIG. 2 is an exploded schematic diagram of the prism module of the camera lens shown in FIG. 1.
Figure 3:
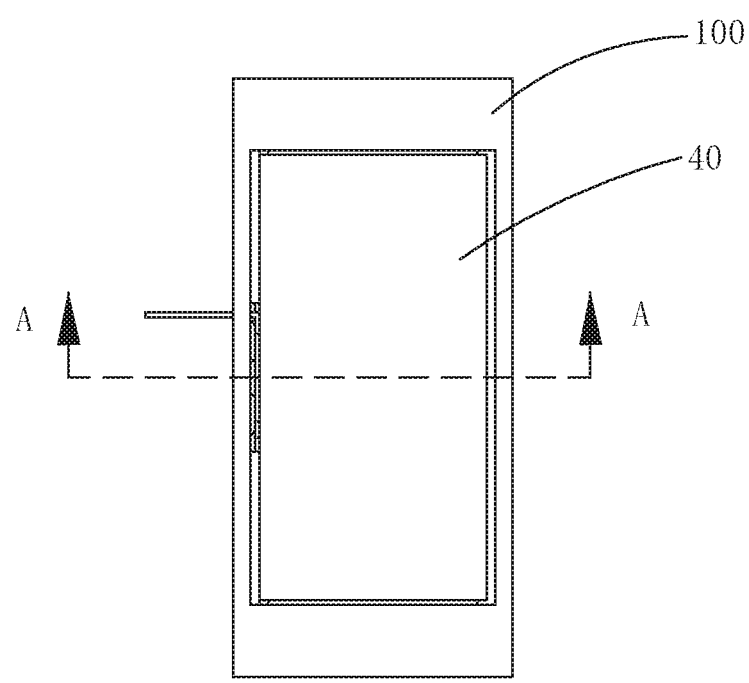
FIG. 3 is a top view of a prism module of a camera lens.
Figure 4:
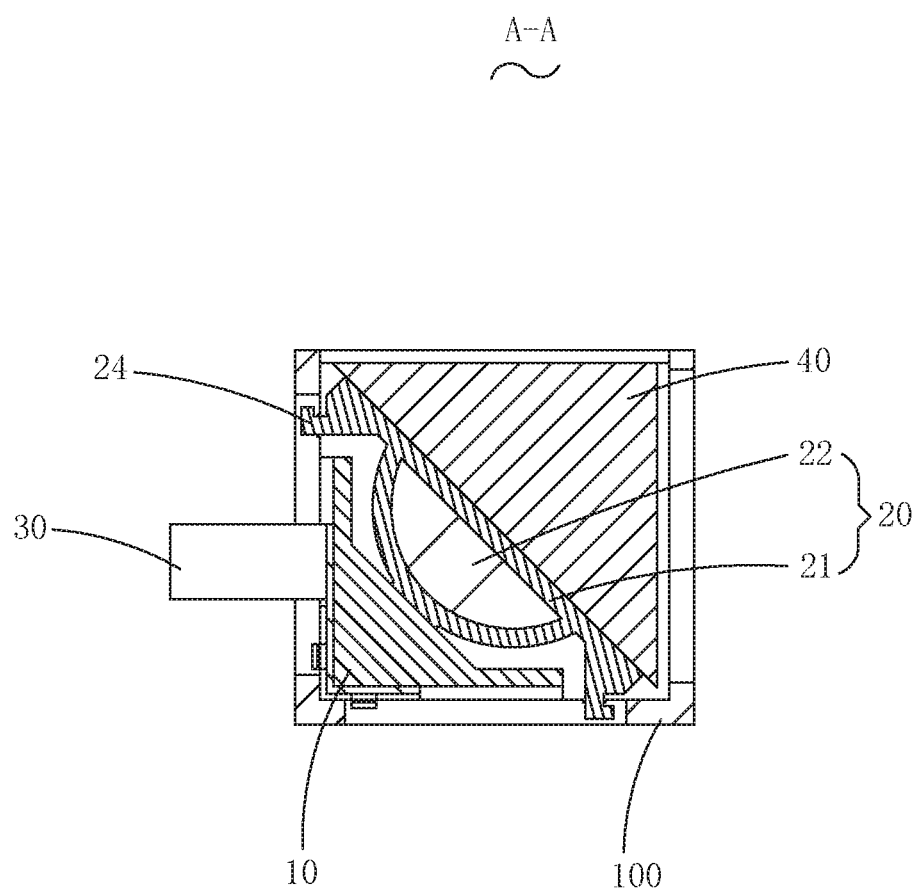
FIG. 4 is a sectional view of a prism module of a camera lens taken along line A-A shown in FIG. 3.
Figure 5:
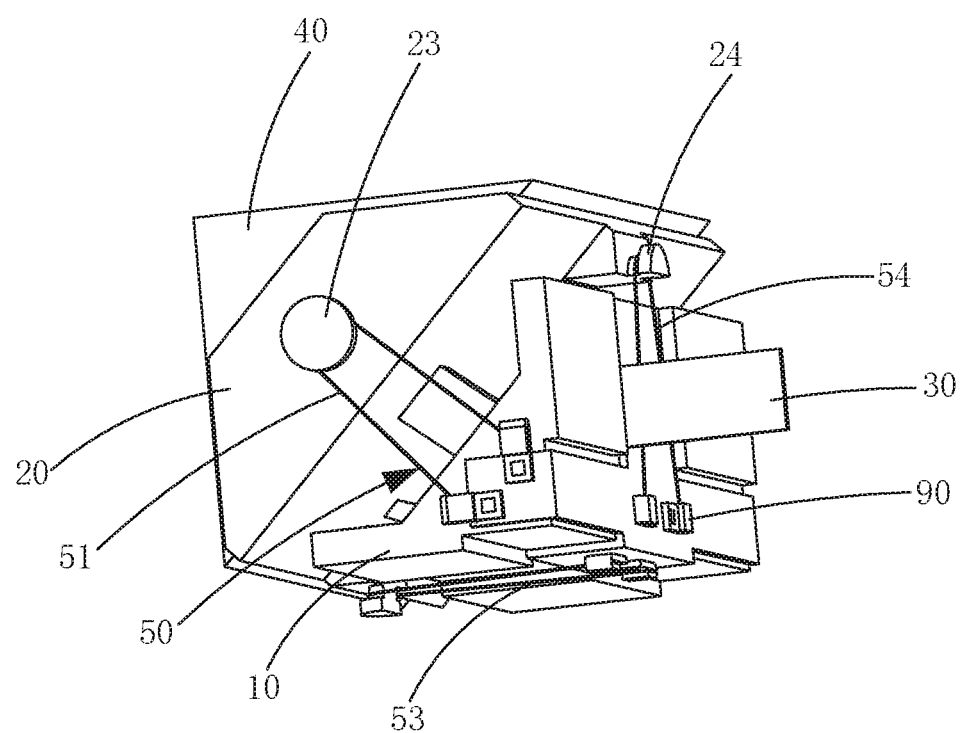
FIG. 5 is a three-dimensional diagram of the prism module of the camera lens shown in FIG. 1 with an outer frame removed.

In the figures: 1, prism module of camera lens; 10, fixed holder; 11, horizontal support plate; 111, first avoiding groove; 12, vertical support plate; 121, second avoiding groove; 13, support boss; 131, inclined surface; 14, recess; 15, communicating groove; 16, protrusion; 20, rotary holder; 21, base; 211, base plate; 212, side plate; 213, receiving groove; 214, first side edge; 215, second side edge; 22, rotation connecting bracket; 221, first elastic support arm; 222, second elastic support arm; 223, third elastic support arm; 224, fourth elastic support arm; 23, first hanging post; 24, second hanging post; 30, circuit board; 31, through hole; 40, prism; 50, rotation driver assembly; 51, first memory alloy; 52, second memory alloy; 53, third memory alloy; 54, fourth memory alloy; 60, first connecting terminal; 61, clamping opening; 62, clamping portion; 70, second connecting terminal; 80, third connecting terminal; 90, fourth connecting terminal; 100, outer frame; 110, first opening; 120, second opening; 130, third opening; 140, fourth opening.

DESCRIPTION OF EMBODIMENTS

The present invention is described in detail below with reference to the accompanying drawings and embodiments.

It should be noted that all directional indications (such as up, down, in, out, top, bottom . . . ) in the embodiments of the present invention are only used to explain relative positional relationship of various components under a specific posture (as shown in the drawings), and if the specific posture changes, the directional indications also change accordingly.

In addition, when it is referred that an element is "fixed to" or "arranged on" another element, the element can be directly fixed to or arranged on another element or through an intermediate element arranged between the element and another element. When it is referred that an element is "connected to" another element, the element can be connected to another element directly or connected to another element through an intermediate element arranged between the element and another element.

Referring to FIG. 1 to FIG. 9, an embodiment of the present invention provides a prism module 1 of a camera lens. The prism module 1 of the camera lens includes a fixed holder 10, a rotary holder 20, a circuit board 30, a prism 40, and a rotation driver assembly 50. The rotary holder 20 is rotatably mounted to the fixed holder 10, the prism 40 is mounted to the rotary holder 20 and can rotate with the rotary holder 20, the circuit board 30 and the rotation driver assembly 50 are connected to each other in such a manner that a current is applied to the rotation driver assembly 50, and the rotation driver assembly 50 is provided between the fixed holder 10 and the rotary holder 20 and is configured to drive the rotary holder 20 to rotate relative to the fixed holder 10. In this way, the prism 40 can be driven by the rotation driver assembly 50 to automatically correct its angle, which obtains a clearer imaging effect.

Figure 6:
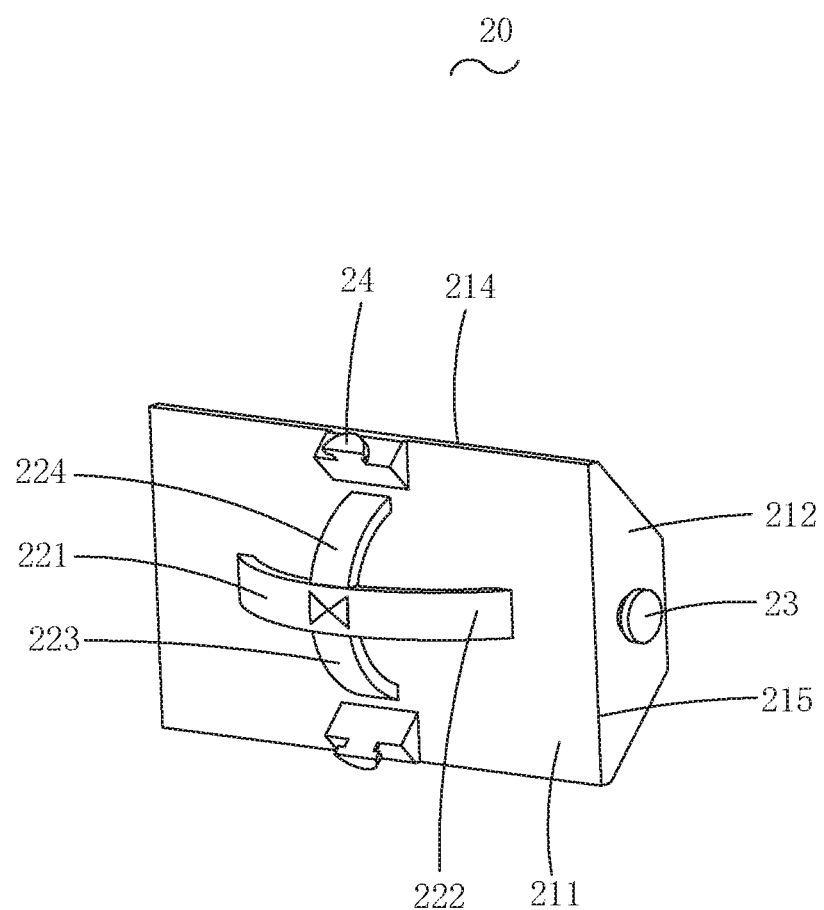
FIG. 6 is a three-dimensional view of a rotary base.

Referring to FIG. 6, in an embodiment, the rotary holder 20 includes a base 21 for receiving and locating the prism 40, and a rotation connecting bracket 22 provided on a side of the base 21 facing towards the fixed holder 10 and configured to support the base 21 to rotate. The rotation driver assembly 50 is formed by several memory alloys and is deformed, under control of an electric signal transmitted from the circuit board 30, to drive the base 21 to rotate. In the embodiment, the rotation connecting bracket 22 and the base 21 are directly connected to each other and are formed into one piece, and no additional connecting members is provided between the rotary holder 20 and the fixed holder 10, simplifying the structure of the rotating holder 20, reducing the assembly process, and reducing the production cost of the rotary holder 20.

In an embodiment, the base 21 includes a base plate 211 and two side plates 212. In an embodiment, the base plate 211 carries the prism 40 and includes two first side edges 214 and two second side edges 215. The two first side edges 214 are opposite to and spaced apart from each other, and two second side edges 215 are opposite to and spaced apart from each other. The two second side edges 215 are perpendicularly connected to the two first side edges 214, respectively. The two side plates 212 are located on two second side edge 215, respectively. The two side plates 212 extend from the two second side edges 215 of the base plate 211 along a direction facing away from the fixed holder 10, respectively. The base plate 211 and the two side plates 212 define a receiving groove 213, and the prism 40 is mounted in the receiving groove 213. The rotation connecting bracket 22 is convexly arranged on a side surface of the base plate 211 facing towards the fixed holder 10, in such a manner that the prism 40 can rotate relative to the fixed holder 10 through the rotation connecting bracket 22.

In an embodiment, the rotation connecting bracket 22 is elastic and includes a first elastic support arm 221, a second elastic support arm 222, a third elastic support arm 223 and a fourth elastic support arm 224. Each of the first elastic support arm 221, the second elastic support arm 222, the third elastic support arm 223 and the fourth elastic support arm 224 is of an arc structure, and has one end fixed on the fixed holder 10. The first elastic support arm 221 and the second elastic support arm 222 are divergently arranged towards the two second side edges 215 of the base plate 211, respectively, in such a manner that the base plate 211 is supported to drive the prism 40 to rotate about a first rotation axis, and the a first rotation axis extends in a direction along which an inclined surface 131 is inclined (the direction indicated by the dotted line M in FIG. 1). The other end of the third elastic support arm 223 and the other end of the fourth elastic support arm 224 are divergently arranged towards the two first side edges 214 of the base plate 211, respectively, in such a manner that the base plate 211 is supported to drive the prism 40 to rotate about a second rotation axis, and the second rotation axis extends in a direction parallel to a connecting line between a horizontal support plate 11 and a vertical support plate 12 (the direction indicated by an axis X in FIG. 1). The first rotation axis perpendicularly intersects the second rotation axis. Therefore, it is determined that a contact site where the rotation connecting bracket 22 contact the inclined surface 131 on the fixed holder 10 is a rotation fulcrum of the rotating holder 20. The structure of the rotation connecting bracket 22 is not limited herein, for example, the rotation connecting bracket 22 can also be hemispherical.

It should be noted, when the memory alloy in this embodiment is supplied with a current, the memory alloy will generate heat due to energization, and is deformed according to its own physical characteristics, i.e., its length being shortened, thereby forming a driving force for driving the rotary holder 20 and the prism 40 to rotate. In an embodiment, when the power supply is cut off and then restarted, the memory alloy cannot reset the prism module 1 to its initial position. In this case, an elastic force of the rotation connecting bracket 22 will be utilized to reset the prism module 1 to the initial position. During normal use, the rotation connecting bracket 22, due to its elastic force, can also enable the rotation driver assembly 50 to drive the rotary holder 20 to rotate relative to the fixed holder 10, and this operation is conducted more smoothly.

Figure 7:
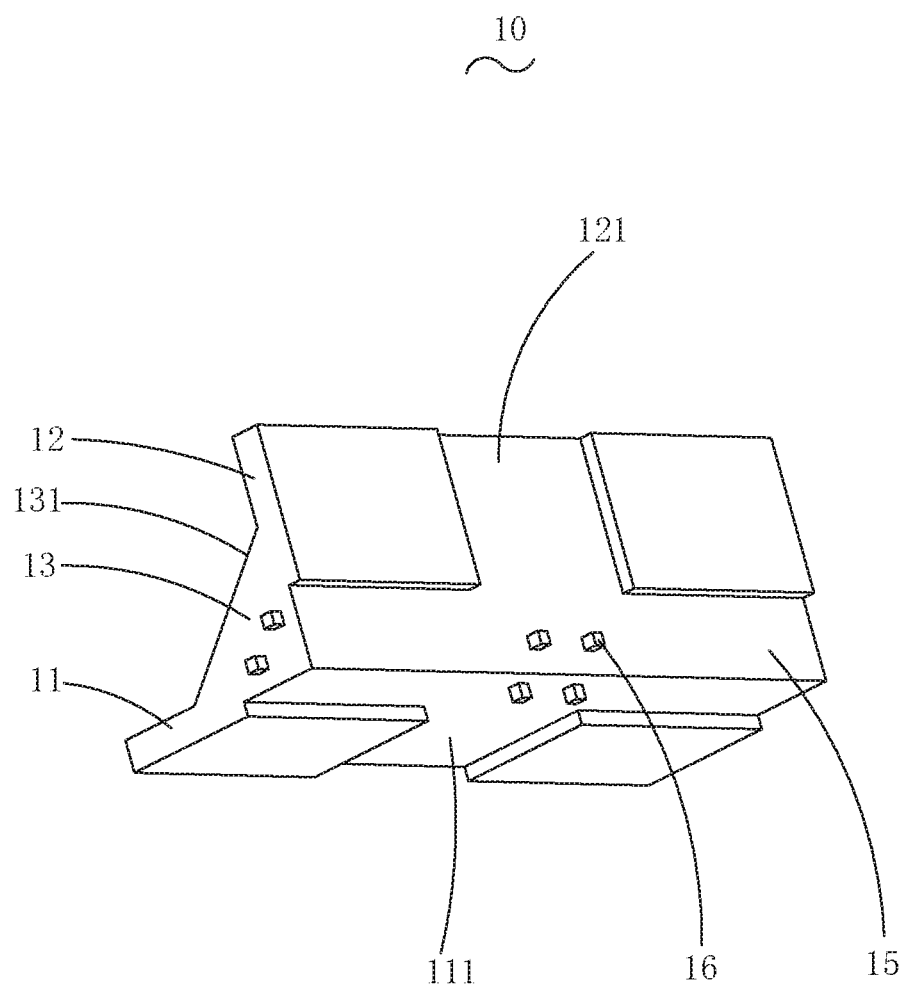
FIG. 7 is a three-dimensional view of a fixed base.

Referring to FIG. 7, in an embodiment, the fixed holder 10 includes a horizontal support plate 11, a vertical support plate 12, and a support boss 13. The vertical support plate 12 extends from one end of the horizontal support plate 11 while being bent upward, and the vertical support plate 12 and the horizontal support plate 11 define a recess 14 in which the support boss 13 is arranged. The support boss 13 includes an inclined surface 131 that extends obliquely from the vertical support plate 12 to the horizontal support plate 11, each one of an included angle formed by the inclined surface 131 and the horizontal support plate 11 and an included angle formed by the inclined surface 131 and the vertical support plate 12 is of a value selected from a range from (45°+2°) to (45°−2°). The rotation connecting bracket 22 abuts against the inclined surface 131. The horizontal support plate 11 and the vertical support plate 12 also have a function of limiting a rotation angle of the rotary holder 20. For example, an end of the horizontal support plate 11 close to the base plate 211 is located directly under one of the two first side edges 214 of the base plate 211, and an end of the vertical support plate 12 close to the base plate 211 is located directly under the other one of the two first side edges 214 of the base plate 211. During rotation of the base plate 211, the two first side edges 214 of the base plate 211 will be in contact with the horizontal support plate 11 or the vertical support plate 12.

Referring to FIG. 2 to FIG. 5, the rotation driver assembly 50 includes a first memory alloy 51, a second memory alloy 52, a third memory alloy 53, and a fourth memory alloy 54, and the prism 40 can be driven by the memory alloys to automatically correct its angle. In a use process, the first memory alloy 51 and the second memory alloy 52 are connected to the base plate 211 and the fixed holder 10 from the two second side edges 215, respectively, and the first memory alloy 51 and the second memory alloy 52 drive the base plate 211 to drive the prism 40 to rotate about the first rotation axis with the contact site where the rotation connecting bracket 22 is in contact with the inclined surface 131 used as the rotation fulcrum.

The third memory alloy 53 and the fourth memory alloy 54 are connected to the base plate 211 and the fixed holder 10 from the two first side edges 214, respectively, and the third memory alloy 53 and the fourth memory alloy 54 drive the base plate 211 to drive the prism 40 to rotate about the second rotation axis with the contact site where the rotation connecting bracket 22 contacts the inclined surface 131 used as a rotation fulcrum.

In an embodiment, two ends of the first memory alloy 51 are fixed on one side surface of the support boss 13, and a middle portion of the first memory alloy 51 is hooked on one side plate 212, in such a manner that the first memory alloy 51 is formed into a "V" shape. Two ends of the second memory alloy 52 are fixed on another side surface of the support boss 13, and a middle portion of the second memory alloy 52 is hooked on the other side plate 212, in such a manner that the second memory alloy 52 is formed into a "V" shape. Two ends of the third memory alloy 53 are fixed on a side surface of the horizontal support plate 11 facing away from the recess 14, and a middle portion of the third memory alloy 53 is hooked on one first side edge 214 of the base plate 211, in such a manner that the third memory alloy 53 is formed into a "V" shape. Two ends of the fourth memory alloy 54 are fixed on a side surface of the vertical support plate 12 facing away from the recess 14, and a middle portion of the fourth memory alloy 54 is hooked on the other first side edge 214 of the base plate 211, in such a manner that the fourth memory alloy 54 is formed into a "V" shape.

In an embodiment, the prism module 1 further includes two first connecting terminals 60 spaced apart from each other and arranged on one side of the support boss 13, two second connecting terminals 70 spaced apart from each other and arranged on the other side of the support boss 13, two third connecting terminals 80 spaced apart from each other and arranged on a surface of the horizontal support plate 11 facing away from the recess 14, and two fourth connecting terminals 90 spaced apart from each other and arranged on a side surface of the vertical support plate 12 facing away from recess 14. A first hanging post 23 is convexly provided on a side of each of the two side plates 212 facing away from the receiving groove 213, and the two second hanging posts 24 are convexly provided on a side surface of the base plate 211 facing towards the recess 14 and respectively arranged close to the two first side edges 214.

The middle portion of the first memory alloy 51 is hooked on the first hanging post 23 of one of the two side plates 212, and the two ends of the first memory alloy 51 are connected to the two first connecting terminals 60, respectively. The middle portion of the second memory alloy 52 is hooked on the first hanging post 23 of the other one of the two side plates 212, and the two ends of the second memory alloy 52 are connected to the two second connecting terminals 70, respectively. The middle portion of the third memory alloy 53 is hooked on one of the two second hanging posts 24, and the two ends of the third memory alloy 53 are connected to the two third connecting terminals 80, respectively. The middle portion of the fourth memory alloy 54 is hooked on the other one of the two second hanging posts 24, and the two ends of the fourth memory alloy 54 are connected to the two fourth connecting terminals 90, respectively. The first connecting terminals 60, the second connecting terminals 70, the third connecting terminals 80 and the fourth connecting terminals 90 are all electrically connected to the circuit board 30, and the circuit board 30 is configured to supply current to these four memory alloys through the four terminals, respectively.

Figure 8:
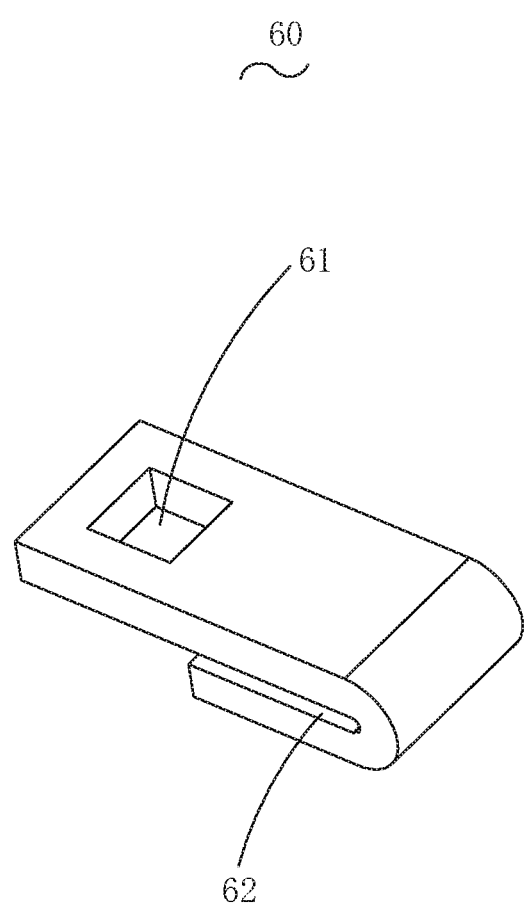
FIG. 8 is a three-dimensional view of a first connecting terminal.
Figure 9:
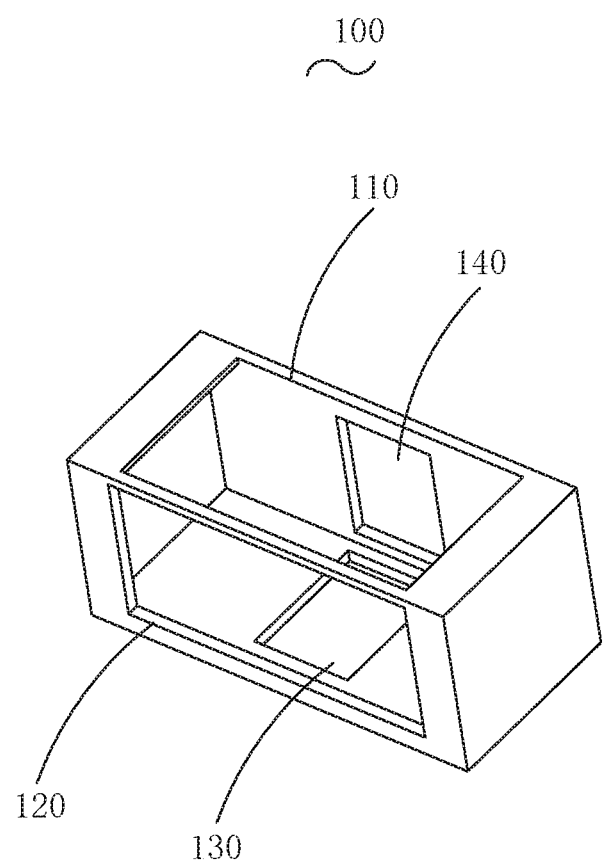
FIG. 9 is a three-dimensional view of an outer frame.

Referring to FIG. 8, a plurality of protrusions 16 protrudes from the fixed holder 10 base, and through holes 31 matching the protrusions 16 are provided in the circuit board 30. A clamping opening 61 that matches the protrusion 16 and clamping portions 62 for holding a corresponding memory alloy are provided on each connecting terminal. Each protrusion 16 is inserted through one through hole 31 of the circuit board 30 and then is be locked and fixed with one clamping opening 61 of one corresponding connecting terminal.

A first avoiding groove 111 for avoiding the third memory alloy 53 is provided on a side surface of the horizontal support plate 11 facing away from the support boss 13, and a second avoiding groove 121 for avoiding the fourth memory alloy 54 is provided on a side surface of the vertical support plate 12 facing away from the support boss 13, in such a manner that the third memory alloy 53 and the fourth memory alloy 54 interfering with the fixed holder 10 during operation, and at the same time, to roughly position the third memory alloy 53 and the fourth memory alloy 54 on the fixed holder 10. In an embodiment, a communicating groove 15 for receiving the circuit board 30 is provided on the fixed holder 10, and the first avoiding groove 111 communicates with the second avoiding groove 121 through the communicating groove 15.

During operation, as shown in FIG. 1, when the first memory alloy 51 is energized to generate heat and shortened, the base 21 is pulled obliquely downward, in such a manner that the base 21 rotates in a positive direction of the axis X with the contact site where the rotation connecting bracket 22 is in contact with the inclined surface 131 as the fulcrum and the direction indicated by the dotted line M as the rotation axis, in such a manner that the prism 40 is driven to rotate relative to the fixed holder 10 in the positive direction of the axis X about the direction indicated by the dotted line M. When the second memory alloy 52 is energized to generate heat and is shortened, the prism 40 rotates relative to the fixed holder 10 in a negative direction of the axis X about the direction indicated by the dotted line M. When the third memory alloy 53 is energized to generate heat and get shortened, the prism 40 can rotate relative to the fixed holder 10 in a direction of the axis X. When the fourth memory alloy 54 is energized to generate heat and is shortened, the prism 40 can rotate relative to the fixed holder 10 in a direction opposite to the direction of the axis X. The rotation connecting bracket 22 is configured to reset the rotary holder 20. The memory alloy of the present invention can also be referred to as shape memory alloy (SMA) wire, which will not be described in detail herein.

Referring to FIG. 1 to FIG. 9, the prism module 1 further includes an outer frame 100. The fixed holder 10, the rotary holder 20, the prism 40, the rotation driver assembly 50, the circuit board 30, the first connecting terminals 60, the second connecting terminals 70, the third connecting terminals 80 and the fourth connecting terminals 90 are all received in the outer frame 100. Four adjacent side surfaces of the outer frame 100 are respectively provided with a first opening 110, through which light is to enter the prism 40, a second opening 120, through which the light is to exit the prism 40 after being be refracted, a third opening 130 for avoiding the third connecting terminal 80, and a fourth opening 140 for the circuit board 30 to be inserted through.

It should be noted that, the above are merely embodiments of the present invention, those skilled in the art can make improvements without departing from the inventive concept of the present invention, and these improvements shall fall into the protection scope of the present invention.

What is claimed is:
1. A prism module of a camera lens, comprising:
a fixed holder;
a rotary holder rotatably mounted to the fixed holder;
a prism mounted to the rotary holder and rotatable with the rotary holder;
a rotation driver assembly provided between the fixed holder and the rotary holder and configured to drive the rotary holder to rotate relative to the fixed holder; and
a circuit board electrically connected to the rotation driver assembly, wherein the rotary holder comprises a base for receiving and locating the prism, and a rotation connecting bracket provided at a side of the base facing towards the fixed holder and configured to support a rotation of the base; and the rotation driver assembly is made of a memory alloy in such a manner that the rotation driver assembly is deformed, under control of an electrical signal transmitted from the circuit board, to drive the base to rotate;

wherein the base comprises a base plate that carries the prism, and the base plate comprises two first side edges spaced apart from each other and two second side edges that are spaced apart from the opposite to each other and are perpendicularly connected to the two first side edges, respectively;

wherein the rotation connecting bracket comprises a first elastic support arm, a second elastic support arm, a third elastic support arm and a fourth elastic support arm, wherein each of the first elastic support arm, the second elastic support arm, the third elastic support arm, and the fourth elastic support arm has one end fixed to the fixed holder, another end of the first elastic support arm and another end of the second elastic support arm face towards the two second side edges of the base plate, respectively, in such a manner that the base plate is supported to drive the prism to rotate about the first rotation axis; and another end of the third elastic support arm and another end of the fourth elastic support arm face towards the two first side edges of the base plate, respectively, in such a manner that the base plate is supported to drive the prism to rotate about the second rotation axis.

2. The prism module of the camera lens as described in claim 1, wherein
the rotation driver assembly comprises a first memory alloy, a second memory alloy, a third memory alloy, and a fourth memory alloy, wherein the first memory alloy and the second memory alloy are connected to the base plate and the fixed holder from the two second side edges, respectively, and the third memory alloy and the fourth memory alloy are connected to the base plate and the fixed holder from the two first side edges, respectively; and the first memory alloy and the second memory alloy drive the base plate in such a manner that the prism is driven to rotate about a first rotation axis, and the third memory alloy and the fourth memory alloy drive the base plate in such a manner that the prism is driven to rotate about a second rotation axis, wherein the first rotation axis perpendicularly intersects the second rotation axis.

3. The prism module of the camera lens as described in claim 1, wherein the base further comprises two side plates, wherein the two side plates extend from the two second side edges of the base plate along a direction facing away from the fixed holder, respectively, and the base plate and the two side plates define a receiving groove in which the prism is mounted.

4. The prism module of the camera lens as descried in claim 3, wherein the fixed holder comprises a horizontal support plate, a vertical support plate and a supporting boss, wherein the vertical support plate extends from one end of the horizontal support plate while being bent, the vertical support plate and the horizontal support plate define a recess, the supporting boss is convexly arranged in the recess and has an inclined surface extending obliquely from the vertical support plate to the horizontal support plate, and the rotation connecting bracket abuts against the inclined surface.

5. The prism module of the camera lens as descried in claim 4, wherein the first memory alloy has two ends fixed to one side surface of the supporting boss and a middle portion hooked on one of the two side plates in such a manner that the first memory alloy is formed into a "V" shape; and the second memory alloy has two ends fixed to the other side surface of the supporting boss, and a middle portion hooked on the other one of the two side plates in such a manner that the second memory alloy is formed into a "V" shape.

6. The prism module of the camera lens as descried in claim 5, further comprising:
two first connecting terminals mounted to one side of the supporting boss and spaced apart from each other, wherein the two ends of the first memory alloy are connected to the two first connecting terminals, respectively; and
two second connecting terminals mounted to another side of the supporting boss and spaced apart from each other, wherein the two ends of the second memory alloy are connected to the two second connecting terminals, respectively; and/or
a first hanging post provided on a side of each of the two side plates facing away from the receiving groove, wherein the middle portion of the first memory alloy is hooked on the first hanging post of one of the two side plates, and the middle portion of the second memory alloy is hooked on the first hanging post of the other one of the two side plates.

7. The prism module of the camera lens as descried in claim 6, wherein the third memory alloy has two ends fixed to a side surface of the horizontal support plate facing away from the recess, and a middle portion hooked on one of the first side edges of the base plate in such a manner that the third memory alloy is formed into a "V" shape; and the fourth memory alloy has two ends fixed to a side surface of the vertical support plate facing away from the recess, and a middle portion hooked on the other one of the two first side edge of the base plate in such a manner that the fourth memory alloy is formed into a "V" shape.

8. The prism module of the camera lens as descried in claim 7, further comprising:
two third connecting terminals mounted to the side surface of the horizontal support plate facing away from the recess and spaced apart from each other, wherein the two ends of the third memory alloy are connected to the two third connecting terminals, respectively; and
two fourth connecting terminals mounted to the side surface of the vertical support plate facing away from the recess and spaced apart from each other, wherein the two ends of the fourth memory alloy are connected to the two fourth connecting terminals, respectively; and/or
two second hanging posts convexly provided on a side of the base plate facing towards the recess and respectively close to the two first side edges, wherein the middle portion of the third memory alloy is hooked on one of the two second hanging posts, and the middle portion of the fourth memory alloy is hooked on the other one of the two second hanging posts.

9. The prism module of the camera lens as descried in claim 8, wherein a first avoiding groove for avoiding the third memory alloy is provided on a side surface of the horizontal support plate facing away from the supporting boss, and a second avoiding groove for avoiding the fourth memory alloy is provided on a side surface of the vertical support plate facing away from the supporting boss; and/or the prism module further comprises an outer frame, wherein the fixed holder, the rotary holder, the prism, the rotation driver assembly, the two first connecting terminals, the two second connecting terminals, the two third connecting terminals, and the two fourth connecting terminals are all received in the outer frame, the two first connecting terminals, the two second connecting terminals, the two third connecting terminals, and the two fourth connecting terminals are all electrically connected to the circuit board, the outer frame is provided with a first opening, through which light is to enter the prism, and a second opening, through which the light is to exit the prism after being refracted, and the first opening and the second opening are provided on two adjacent side surfaces of the outer frame, respectively.

* * * * *